United States Patent
Sazegari et al.

(10) Patent No.: US 12,118,332 B2
(45) Date of Patent: Oct. 15, 2024

(54) EXECUTION CIRCUITRY FOR FLOATING-POINT POWER OPERATION

(71) Applicant: Apple Inc., Cupertino, CA (US)

(72) Inventors: Ali Sazegari, Los Altos, CA (US); Segev Elmalem, Tel-Aviv (IL); O-Cheng Chang, Cupertino, CA (US); Jingwei Zhang, Santa Clara, CA (US); Ido Soffair, Tel-Aviv (IL); Aaftab A. Munshi, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/045,577

(22) Filed: Oct. 11, 2022

(65) Prior Publication Data

US 2024/0094989 A1    Mar. 21, 2024

Related U.S. Application Data

(60) Provisional application No. 63/376,339, filed on Sep. 20, 2022.

(51) Int. Cl.
*G06F 7/552* (2006.01)

(52) U.S. Cl.
CPC .................. *G06F 7/552* (2013.01)

(58) Field of Classification Search
CPC ...... G06F 7/552; G06F 7/556; G06F 2101/08; G06F 2101/10
See application file for complete search history.

(56) References Cited

U.S. PATENT DOCUMENTS

| | | | | |
|---|---|---|---|---|
| 5,926,406 A | * | 7/1999 | Tucker | G06F 7/556 708/512 |
| 6,480,873 B1 | * | 11/2002 | Inoue | G06F 7/556 708/512 |

(Continued)

FOREIGN PATENT DOCUMENTS

WO      2021074795 A1    4/2021

OTHER PUBLICATIONS

International Search Report and Written Opinion in PCT Appl. No. PCT/US2023/028161 mailed Nov. 2, 2023, 8 pages.

*Primary Examiner* — Matthew D Sandifer
(74) *Attorney, Agent, or Firm* — Kowert, Hood, Munyon, Rankin & Goetzel, P.C.; Michael B. Davis; Dean M. Munyon

(57) ABSTRACT

Techniques are disclosed relating to dedicated power function circuitry for a floating-point power instruction. In some embodiments, execution circuitry is configured to execute a floating-point power instruction to evaluate the power function $x^y$ as $2^{y \, log_2 x}$. In some embodiments, base-2 logarithm circuitry is configured to evaluate a base-2 logarithm for a first input (e.g., $log_2 x$) by determining coefficients for a polynomial function and evaluating the polynomial function using the determined coefficients and the first input. In some embodiments, multiplication circuitry multiplies the base-2 logarithm result by a second input to generate a multiplication result. In some embodiments, base-2 power function circuitry is configured to evaluate a base-2 power function for the multiplication result. Disclosed techniques may advantageously increase performance and reduce power consumption of floating-point power function operations with reasonable area and accuracy, relative to traditional techniques.

16 Claims, 9 Drawing Sheets

(56) References Cited

U.S. PATENT DOCUMENTS

| | | |
|---|---|---|
| 2016/0124709 A1 | 5/2016 | Bekas et al. |
| 2019/0042192 A1 | 2/2019 | Pillai et al. |
| 2019/0042922 A1 | 2/2019 | Pillai et al. |
| 2021/0109761 A1 | 4/2021 | Wang et al. |
| 2021/0326107 A1 | 10/2021 | Shi et al. |
| 2021/0382687 A1* | 12/2021 | Tai ......................... G06F 7/483 |
| 2022/0066737 A1 | 3/2022 | Mu et al. |

* cited by examiner

Polynomial approximation: ((x_mantissa*C0 + C1)*x_mantissa + C2)*x_mantissa + C3

EXECUTION CIRCUITRY FOR FLOATING-POINT POWER OPERATION

The present application claims priority to U.S. Provisional Application No. 63/376,339, filed Sep. 20, 2022, the disclosure of which is incorporated by reference herein in its entirety.

BACKGROUND

Technical Field

This disclosure relates generally to computer processors and more particularly to floating-point circuitry.

Description of the Related Art

Complex functions are often executed in computer processors for various applications such as numeric computations, graphics processing, machine learning algorithms, display processing, etc. Generally speaking, computer processors perform many common operations such as multiplication and addition using dedicated circuitry. However, certain more complex operations (such as the power function $x^y$, exponent function, and logarithm function for example) are typically implemented using software libraries with multiple instructions. It may be challenging to implement such operations in hardware with acceptable circuit area and desired accuracy.

DETAILED DESCRIPTION

Figure 1:
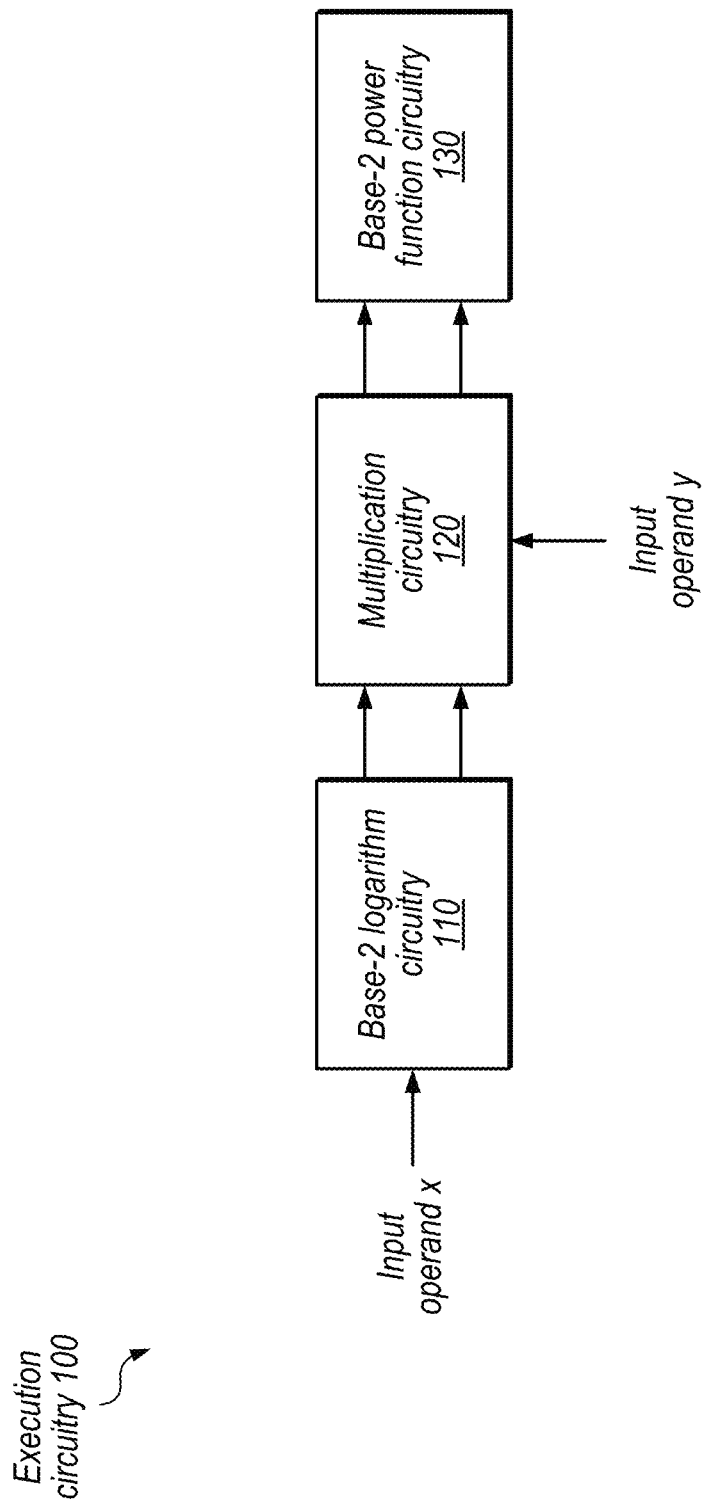
FIG. 1 is a block diagram illustrating example execution circuitry, according to some embodiments.

Common compute functions such as multiplication and addition typically utilize dedicated circuitry to generate floating-point results. For more complex functions such as the power function, however, traditional techniques utilize software libraries, e.g., due to accuracy and area constraints. Speaking generally, disclosed dedicated power function circuitry may substantially increase performance and reduce power consumption of floating-point power function operations with reasonable area and accuracy for a range of input values, relative to traditional techniques.

In some embodiments, execution circuitry is configured to execute a single floating-point power instruction to evaluate the power function, $x^y = 2^{y \cdot \log_2 x}$. Executing a single instruction for the power function may have various performance benefits relative to executing multiple instructions of a software library. Further, disclosed circuitry may implement various techniques to maintain an accuracy target.

For example, in some embodiments, execution hardware approximates the power function in three steps, including performing a base-2 logarithm approximation for the first input (e.g., $\log_2 x$), multiplying the base-2 logarithm approximation result by the second input (e.g., $y \times \log_2 x$), and performing a base-2 power function approximation based on the multiplication result (e.g., $2^{y \cdot \log_2 x}$).

In some embodiments, discussed in detail below, as part of the base-2 logarithm approximation, execution circuitry determines coefficients for a polynomial function and evaluates the polynomial function using the determined coefficients and the x input to generate a result. This operation may use head-tail arithmetic to improve accuracy relative to using the initial input format (e.g., a 32-bit floating-point format) without the circuit area associated with operations in a higher-precision format (e.g., associated with multiplications in a 64-bit floating-point format). Generally, using head-tail arithmetic may reduce rounding errors, assisting in the tradeoff between accuracy and area considerations mentioned above. Further, the base-2 logarithm circuitry may be configured using overlapping intervals when determining coefficients (e.g., using a lookup table), which may reduce error (which typically may be greatest near the edges of a given interval).

Multiplication circuitry may also perform the multiplication operation using head-tail arithmetic. In some embodiments, discussed in detail below, execution circuitry generates a power function result by approximating a base-2 power function based on the multiplication result (and the base-2 power function may also use polynomial approximation).

Note that dedicated power function circuitry, in addition to the performance benefits listed above, may advantageously provide intermediate results utilized by other functions (e.g., a base-2 logarithm result or base-2 power result used as an activation function for a machine learning application) with little to no increases in circuit area. This may reduce power consumption and improve performance for those functions as well.

Example Execution Circuitry

FIG. 1 is a block diagram illustrating example execution circuitry, according to some embodiments. In the illustrated embodiment, execution circuitry 100 includes base-2 logarithm circuitry 110, multiplication circuitry 120, and base-2 power function circuitry 130.

In some embodiments, execution circuitry 100 evaluates a floating-point power function by generating an approximation of a base-2 logarithm for a first input, multiplying the result of the base-2 logarithm approximation by a second input, and generating an approximation of a base-2 power function for a multiplication result.

In the illustrated embodiment, base-2 logarithm circuitry 110 is configured to evaluate a base-2 logarithm based on an input operand x, e.g., $\log_2 x$. In some embodiments, base-2 logarithm circuitry 110 may perform various operations, as discussed in detail below with respect to FIGS. 4 and 5, including the following: argument shift, floating-point conversion, polynomial approximation, head-tail arithmetic addition, etc.

In some embodiments, base-2 logarithm circuitry evaluates the base-2 logarithm of the input operand x by determining coefficients for a polynomial function, based on the input operand x, and evaluating the polynomial function to determine a base-2 logarithm result based on the determined coefficients and the input operand x. In some embodiments, discussed in detail below with respect to FIG. 3, the base-2 logarithm result evaluated by base-2 logarithm circuitry may include a head component and a tail component for head-tail arithmetic.

In some embodiments, head-tail arithmetic is used to generate a greater precision result such that rounding error does not become unacceptable in a later stage (e.g., in the multiplication operation performed by multiplication circuitry 120). As understood by those of skill in the art, head-tail arithmetic represents a higher precision number using two components of lower precision and operates on the two components individually. This approach may advantageously maintain precision without the need to increase the width of certain circuit elements (e.g., multiplier, adder, etc.), which might more substantially impact area considerations, power consumption, etc. Note that in some embodiments, head-tail operations may utilize more than two portions of a given operand, e.g., with a middle portion for three total portions, four total portions, etc., with similar separate operations and subsequent conversion to a more traditional format.

In some embodiments, input operand x is provided in a first floating-point format to base-2 logarithm circuitry 110. As one example, input operand x may be represented using the IEEE standard single precision floating-point format, which represents a floating-point number using 32 bits. In some embodiments, the head and tail components use less than or equal to the number of bits of the input operand x.

In the illustrated embodiment, multiplication circuitry 120 is configured to perform a multiplication operation between the base-2 logarithm result generated by base-2 logarithm circuitry 110 and input operand y, to generate a multiplication result y×$\log_2$ x. In some embodiments, discussed in detail below with respect to FIG. 3, the multiplication operation may be a head-tail operation and the multiplication result may include a multiplication head result and a multiplication tail result.

In the illustrated embodiment, base-2 power function circuitry 130 is configured to evaluate two to the power of a representation of the multiplication result to generate a result of the floating-point instruction in the first floating-point format. The representation of the multiplication result may be the output of converting a head-tail multiplication result to a non-head-tail format, for example. In these embodiments, base-2 power function circuitry 130 is not configured to perform head-tail arithmetic.

Example Pipeline

Figure 2:
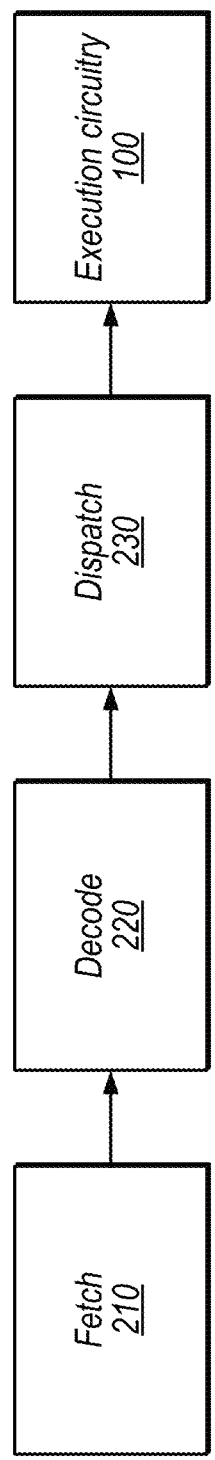
FIG. 2 is a block diagram illustrating an example pipeline, according to some embodiments.

FIG. 2 is a block diagram illustrating an example pipeline, according to some embodiments. In the illustrated embodiment, the example pipeline illustrates multiple elements including fetch stage 210, decode stage 220, dispatch stage 230, and execution circuitry 100. While the illustrated stages are included for purposes of illustration, a given pipeline may include various other stages or may omit illustrated stages, in other embodiments. Further, one or more illustrated elements may themselves be pipelined (e.g., execution circuitry 100 may include multiple stages).

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Fetch stage circuitry 210, in some embodiments, is configured to fetch instructions for execution, including instructions that specify to evaluate a floating-point power function. In some embodiments, a floating-point power instruction may be a single instruction-set-architecture (ISA) instruction. In some embodiments, a floating-point power instruction may be a single micro-operation supported by the processor. In other embodiments, a single floating-point power instruction may be implemented using multiple micro-operations. Note that in other embodiments, multiple instructions (e.g., two or three) may be used to implement the floating-point power operation. Generally, however, the ability to perform the power operation with dedicated hardware support and a limited number of instructions may improve throughput of power operations, with the single-instruction implementation providing the most throughput.

In some embodiments, disclosed techniques may allow fetch stage circuitry 210 to fetch a floating-point power instruction every cycle, which may substantially increase throughput relative to software-based techniques.

Decode stage circuitry 220, in the illustrated embodiment, is configured to decode the fetched instruction from stage 210. In some embodiments, decode 220 prepares the fetched instruction for further processing such as by inspecting opcodes of the fetch instruction and determining locations of source and destination operands, for example.

Dispatch stage circuitry 230, in some embodiments, is configured to dispatch operations to reservation stations (not shown) within various execution units of pipeline circuitry, according to some embodiments.

In the illustrated embodiment, execution circuitry 100 is configured to evaluate a floating-point power function. In some embodiments, this includes evaluating a base-2 logarithm, performing a multiplication operation, and evaluating a base-2 power function, as discussed in detail below with respect to FIG. 3. Note that execution circuitry 100 may also include various other units, e.g., an integer unit, a load/store unit, etc. Various units of execution circuitry 100 may be pipelined.

Detailed Execution Circuitry

Figure 3:
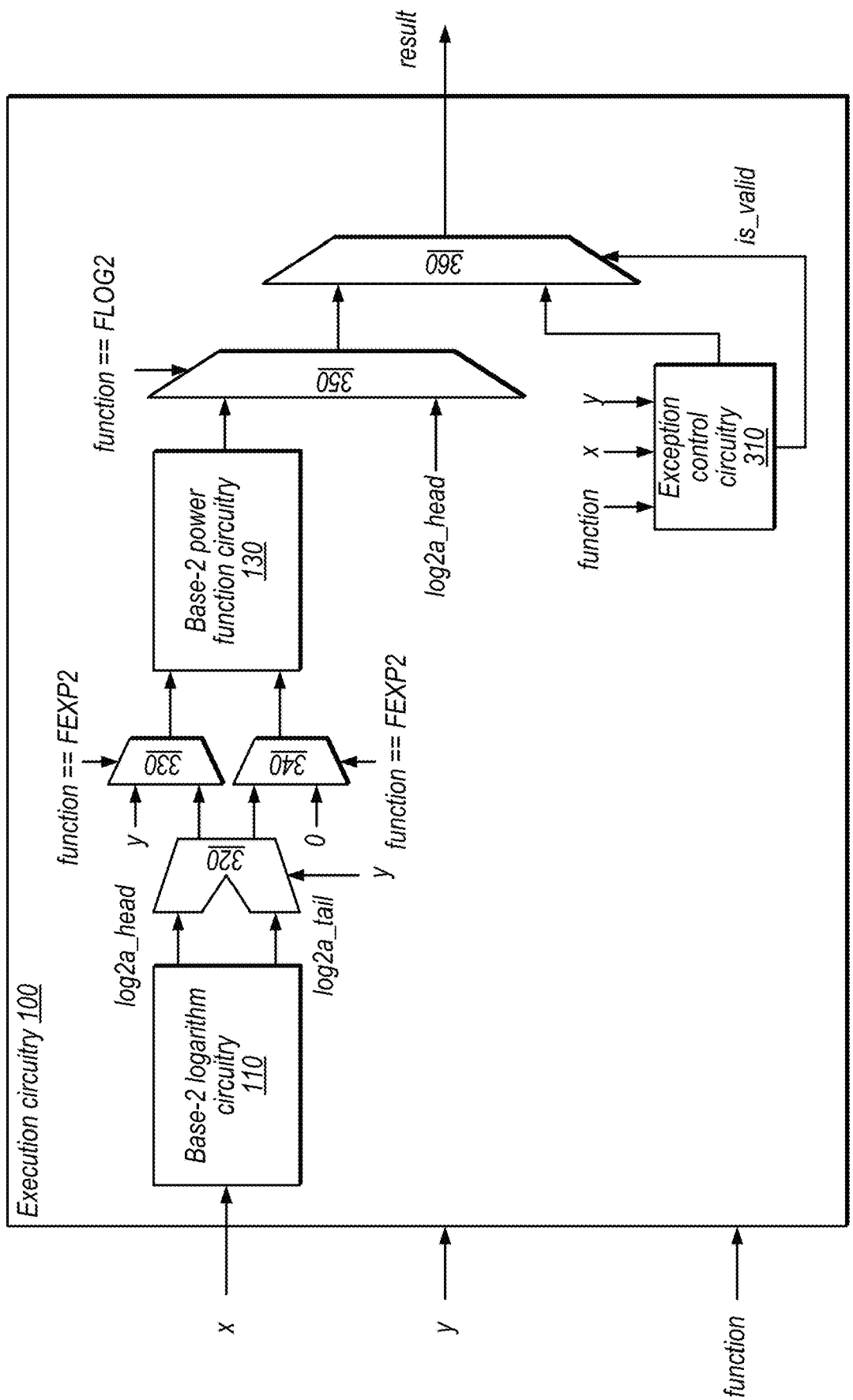
FIG. 3 is a block diagram illustrating detailed example execution circuitry, according to some embodiments.

FIG. 3 is a block diagram illustrating detailed example execution circuitry, according to some embodiments. In the illustrated embodiment, execution circuitry 100 includes base-2 logarithm circuitry 110, base-2 power function circuitry 130, exception control circuitry 310, and various other circuit elements (e.g., a multiplier 320, multiplexors 330, 340, 350, and 360, etc.).

In the illustrated embodiment, execution circuitry 100 is configured to execute a single floating-point power instruction to generate a power function result. In some embodiments, execution circuitry 100 receives input operand x, input operand y, and a function input. In some embodiments, input operands x and y are provided in a first floating-point format (e.g., N-bit floating-point format).

In some embodiments, the function input is based on the type of instruction being executed and specifies whether an intermediary result is to be provided, e.g., using results evaluated by base-2 logarithm circuitry 110 or base-2 power function circuitry 130. Thus, portions the disclosed hardware configured to execute the power function instruction may also be advantageously used to execute other types of instructions, e.g., by selecting intermediate results.

In the illustrated embodiment, base-2 logarithm circuitry 110 evaluates the base-2 logarithm for input operand x. In some embodiments, this includes determining coefficients for a polynomial function based on input operand x and evaluating the polynomial function to determine an approximation of a base-2 logarithm result in a second floating-point format (e.g., head-tail format with an N-bit or less head component and N-bit or less tail component). In some embodiments, determining the base-2 logarithm result includes evaluating the polynomial function based on the determined coefficients and input operand x.

In the illustrated embodiment, the base-2 logarithm result includes head and tail components log 2a_head and log 2a_tail that are inputs to the illustrated multiplier circuit 320 to be multiplied by input operand y.

In the illustrated embodiment, multiplier circuit 320 (which may correspond to multiplication circuitry 120 of FIG. 1) performs a head-tail multiplication operation based on operands log 2a_head, log 2a_tail, and y, to generate a multiplication result that includes a multiplication head result and a multiplication tail result.

In the illustrated embodiment, the multiplication head result and multiplication tail result are inputs to two separate multiplexor circuits 330 and 340 that propagate the multiplication head and multiplication tail results to base-2 power function circuitry 130 for the power function. For a base-2 power instruction (indicated by the function input EXP2), however, the input operand y and value zero are propagated to base-2 power function circuitry 130 instead.

In some embodiments, prior to propagating the specified values to base-2 power function circuitry 130, conversion circuitry (not shown) may convert the multiplication head result and multiplication tail result to the floating-point format of the input operands to generate a converted multiplication result.

In the illustrated embodiment, base-2 power function circuitry 130 is configured to evaluate two to the power of a representation of the multiplication result to generate a result in the first floating point format. The representation of the multiplication result may be the multiplication result itself or the converted multiplication result (e.g., converted from head-tail to a traditional format), for example.

In some embodiments, the result generated by base-2 power function circuitry 130 is propagated through a multiplexor circuit 350 for the power instruction. For a base-2 logarithm instruction (indicated by the function input FLOG2), however, the head result generated by base-2 logarithm circuitry 110 (e.g., log 2a_head) is propagated instead.

In the illustrated embodiment, exception control circuitry 310 is configured to generate exceptions in certain situations based on the provided input operands x and y, and the function input, according to some embodiments. In some embodiments, exception control circuitry 310 is configured to ensure input operand x (e.g., the base) and input operand y (e.g., the exponent) do not fall within a set of constraints, which may be programmable. In some embodiments, the constraints may include but are not limited to the following types of numbers: ±zero, ±∞, ±QNaN (quiet not a number), ±SNaN (signaling not a number), ±sub-normal numbers, negative normal numbers, etc.

In some embodiments, in response to detecting that input operand x or input operand y fall within the constraints listed above, exception control circuitry 310 may provide a 0 value of the is_valid signal and a value associated with the exception to multiplexor circuit 360. In some embodiments, the 0 value of the is_valid signal selects the exception value to be the output result of the multiplexor circuit 360. In some embodiments, based on the function specified and the input operands, the output result may be an SNaN value or some other appropriate value.

Example Base-2 Logarithm Circuitry

Figure 4:
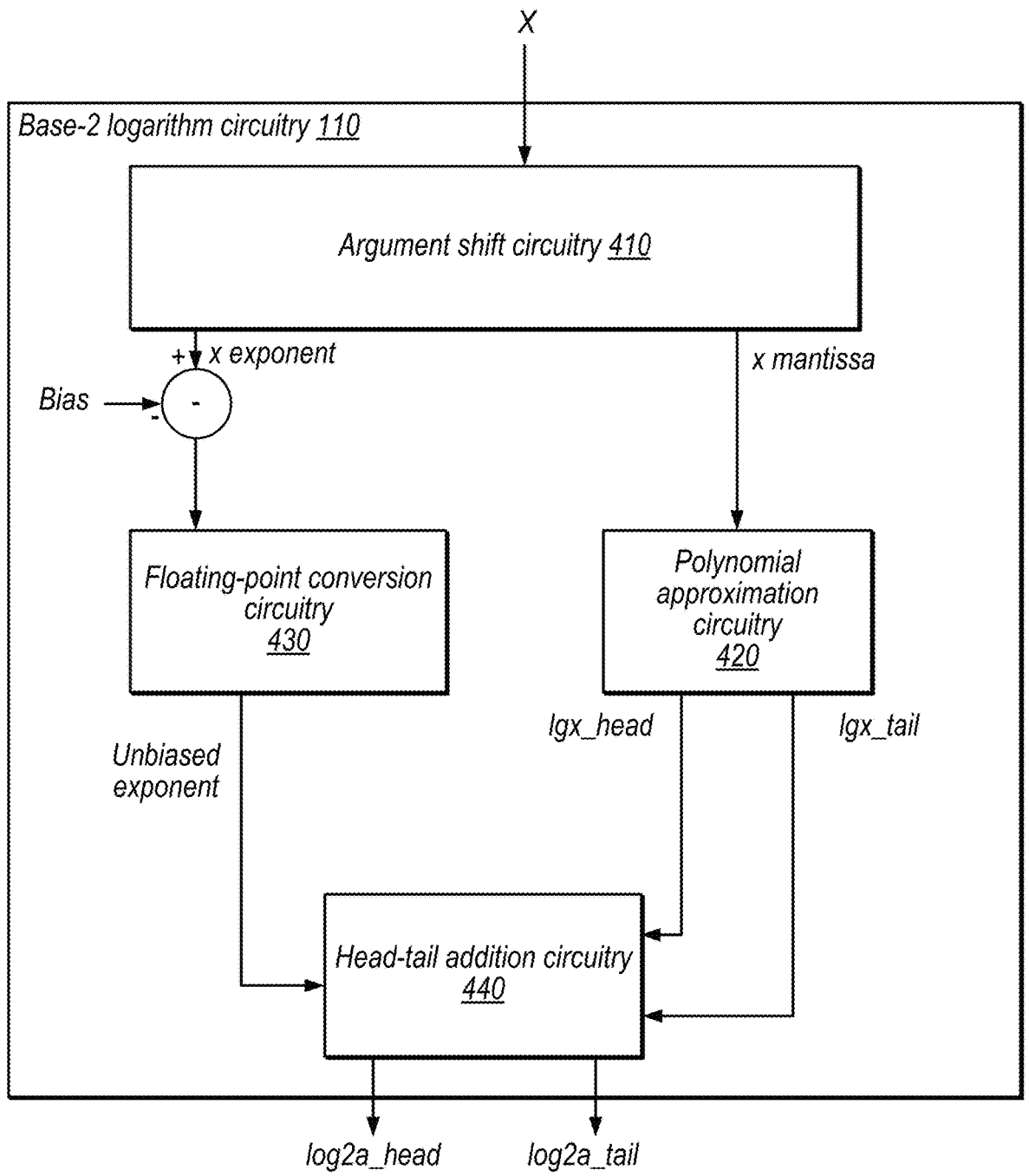
FIG. 4 is a block diagram illustrating example base-2 logarithm circuitry, according to some embodiments.

FIG. 4 is a block diagram illustrating example base-2 logarithm circuitry, according to some embodiments. In the illustrated embodiment, base-2 logarithm circuitry 110 includes argument shift circuitry 410, polynomial approximation circuitry 420, floating-point conversion circuitry 430, and head-tail addition circuitry 440.

In the illustrated embodiment, argument shift circuitry 410 is configured to extract mantissa and exponent values from a floating-point input. In some embodiments, argument shift circuitry 410 receives, as input, input operand x and performs one or more operations to output two values: the mantissa of x and the exponent of x.

In some embodiments, argument shift circuitry 410 computes the mantissa of x by performing a bit-mask AND operation and a bit-mask OR operation. In some embodiments, argument shift circuitry 410 generates the mantissa of x in a floating-point format equivalent to 1.mantissa. In the illustrated embodiment, the mantissa of x propagates to polynomial approximation circuitry 420. In some embodiments, the exponent of x is generated by performing a right-shift operation by a number of bits equal to the size of the mantissa of x (e.g., 23 bits for the IEEE standard single precision floating-point format).

In some embodiments, disclosed circuitry may be configured to provide results for input values within a certain range. In some embodiments, for values greater than the range, the mantissa of x is folded into a smaller range, which may reduce or avoid floating-point cancellation error at a later stage in the pipeline (e.g., in the multiplication step). As one non-limiting example, the mantissa of x may be folded into the smaller range of [0.75, 1.5) which may reduce or avoid floating-point cancellation error at a later stage in the pipeline (e.g., in the multiplication step).

In the illustrated embodiment, polynomial approximation circuitry 420 is configured to generate an approximation of the base-2 logarithm based on the mantissa and generate head and tail results lgx_head and lgx_tail. A detailed example of circuitry 420 is discussed in detail below with reference to FIG. 5.

In the illustrated embodiment, adder circuitry subtracts a bias value from the exponent of x, the result of which propagates to floating-point conversion circuitry 430.

In the illustrated embodiment, floating-point conversion circuitry 430 is configured to convert the exponent of x minus the bias from twos component representation to a single-precision floating-point representation (the unbiased exponent in FIG. 4).

In the illustrated embodiment, head-tail addition circuitry 440 is configured to perform a head-tail addition operation between the unbiased exponent and the head (e.g., lgx_head)

and tail (lgx_tail) outputs generated by polynomial approximation circuitry 420. In some embodiments, the head-tail addition includes to perform separate 32-bit floating-point addition operations to generate the head (log 2a_head) and tail (log 2a_tail) results.

Example Polynomial Approximation Circuitry

Figure 5:
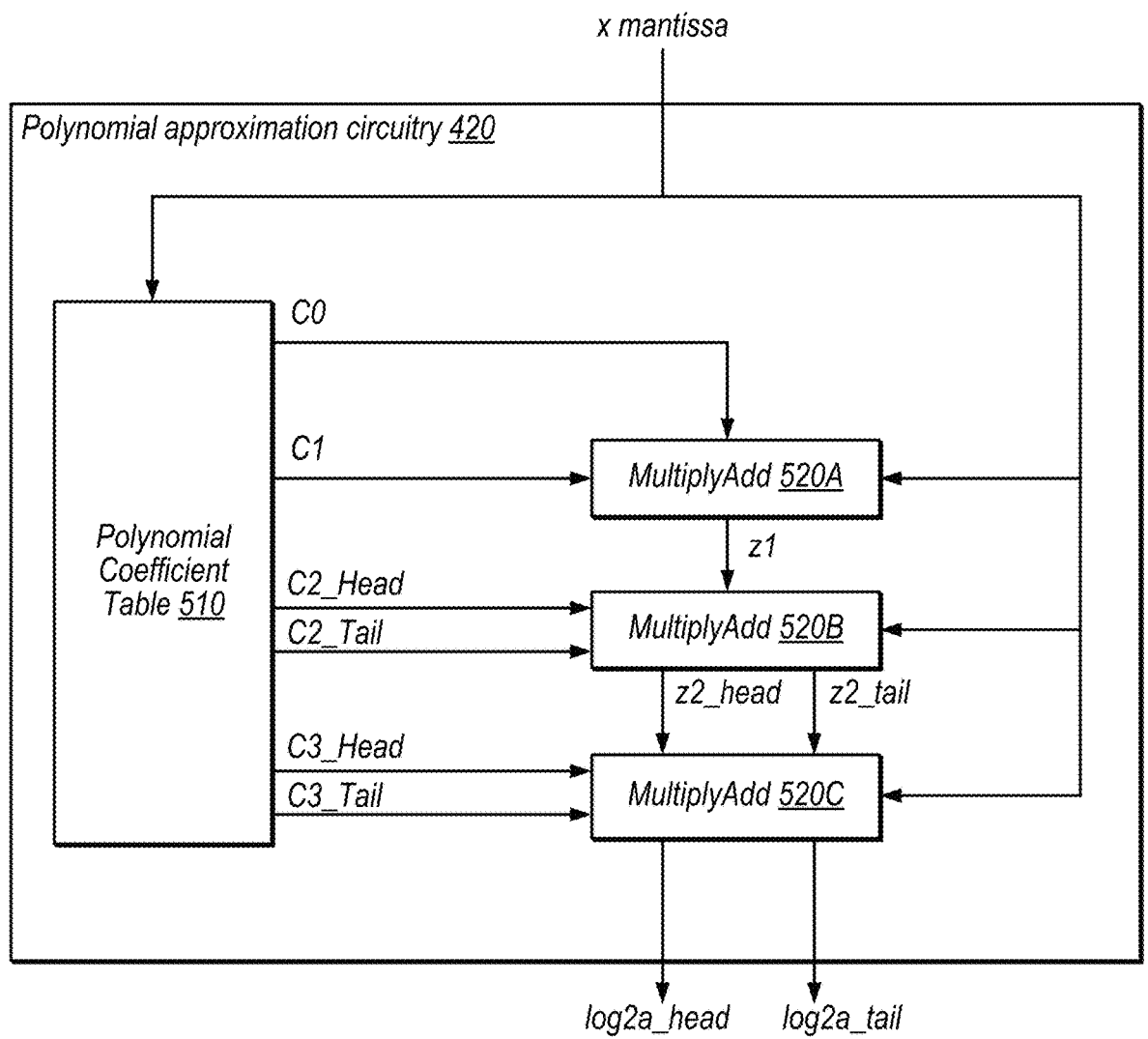
FIG. 5 is a block diagram illustrating detailed example polynomial approximation circuitry, according to some embodiments.

FIG. 5 is a block diagram illustrating detailed polynomial approximation circuitry, according to some embodiments. In the illustrated embodiment, polynomial approximation circuitry 420 includes polynomial coefficient table 510 and fused Multiply/Add circuitry 520A-520C.

In the illustrated embodiment, polynomial approximation circuitry 420 is configured to perform the base-2 logarithm polynomial approximation discussed with reference to FIG. 4 above.

In the illustrated embodiment, polynomial approximation circuitry 420 receives, as input, the mantissa of x and generates a third order polynomial approximation based on the mantissa of x and coefficients stored in polynomial coefficient table 510. In some embodiments, the polynomial approximation is a piecewise polynomial approximation that includes multiple sets of coefficients (e.g., C0-C3 in this example) corresponding to different ranges of input values. In some embodiments, polynomial approximation circuitry 420 implements the polynomial approximation equation, $((x_{mantissa} \times C_0 + C_1) \times x_{mantissa} + C_2) \times x_{mantissa} + C_3$. In the illustrated example, coefficient C0 represents the highest degree coefficient for the third order polynomial approximation, while coefficient C3 represents the lowest degree (e.g., constant) coefficient for the third order polynomial approximation.

In the illustrated embodiment, polynomial coefficient table 510 is configured to store coefficients for the polynomial approximation. Table 510 may store different sets of inputs for different ranges of input x mantissa values. In the illustrated embodiment, some of the determined coefficients include head and tail components (e.g., C2_Head, C2_Tail, etc.) and some of the determined coefficients do not use a head-tail representation (e.g., C0, C1, etc.). This approach may satisfy an accuracy target without using head-tail representations for some values (which may reduce area and power consumption).

In some embodiments, the coefficients stored in table 510 are generated using overlapping intervals. For example, the coefficients for a given entry in table 510 may correspond to a curve fitting over a greater range of input values than a range of input values corresponding to the entry. As one hypothetical example and for purposes of explanation, a given entry of table 510 may store (and return) coefficients for a mantissa of x in the range of input values [0.80, 0.90), but the corresponding coefficients for the given entry may correspond to a curve fitting operation over the greater range [0.78, 0.92).

In some embodiments, generating coefficients in table 510 using overlapping intervals maintains monotonicity of the base-2 logarithm approximation. This may also advantageously reduce error (which typically may be greatest near the edges of a given interval).

In the illustrated embodiment, fused Multiply/Add circuitry 520A-520C is configured to perform cascaded fused multiply-add operations between the determined coefficients and the mantissa of x to implement the polynomial. In other embodiments, fused multiply-add operations may use a variation of the mantissa of x to implement the polynomial. For example, conversion circuitry (not shown) may convert the mantissa of x to a different format before fused Multiply/Add circuitry 520A-520C performs cascaded fused multiply-add operations. In some embodiments, fused Multiply/Add circuitry 520A-520C perform fixed-point fused multiply/add operations.

In some embodiments, fused multiply/add circuit 520A performs a multiplication operation between the mantissa of x and the coefficient C0, followed by addition of the coefficient C1, to generate the expression $(x_{mantissa} \times C_0 + C_1)$ represented by the intermediary result z1.

In some embodiments, fused multiply/add circuit 520B performs a multiplication between the intermediary result z1 and the mantissa of x, followed by a head-tail addition operation using coefficients C2_Head and C2_Tail, to generate intermediary results z2_head and z2_tail. In some embodiments, intermediary result z2_head represents the expression $(x_{mantissa} \times C_0 + C_1) \times x_{mantissa} + C_2\_head$, while z2_tail represents $(x_{mantissa} \times C_0 + C_1) \times x_{mantissa} + C_2\_tail$.

In some embodiments, fused multiply/add circuit 520C performs separate head-tail multiplication operations between the intermediary results z2_head and z2_tail, and the mantissa of x, followed by a head-tail addition operation using coefficients C3_Head and C3_Tail, to generate log 2a_head and log 2a_tail results. In some embodiments, log 2a_head and log 2a_tail represent the head and tail components of the base-2 logarithm polynomial approximation, respectively.

Example Method

Figure 6:
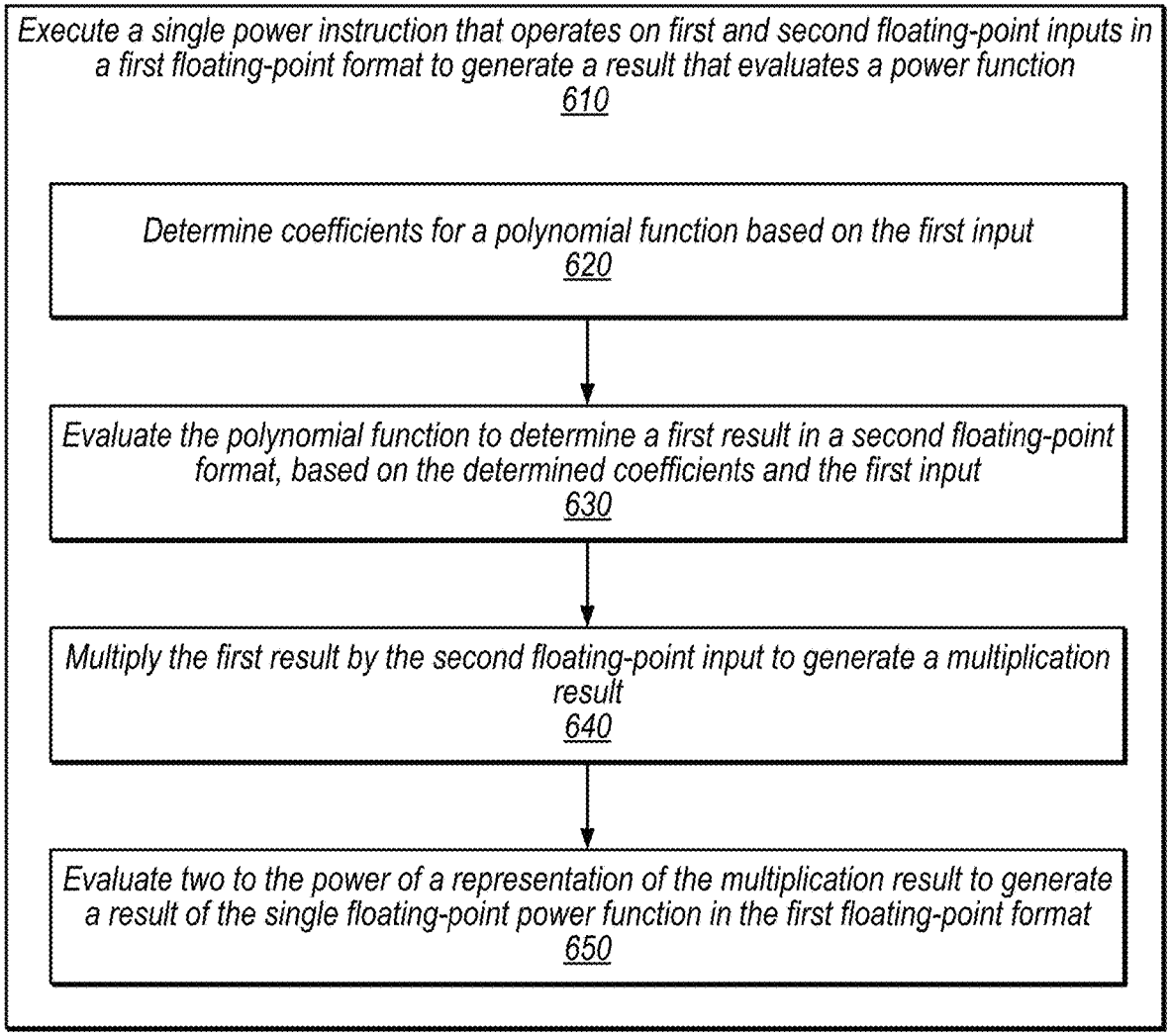
FIG. 6 is a flow diagram illustrating an example method, according to some embodiments.

FIG. 6 is a flow diagram illustrating an example method, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a computing device (e.g., execution circuitry 100) executes a single power instruction that operates on first and second floating-point inputs in a first floating-point format to generate a result that evaluates a power function, $2^{(second\ input * log_2(first\ input))}$.

In some embodiments, the first floating-point format is an N-bit floating-point format. As one example, the first floating-point format may be the IEEE standard single precision floating-point format, which represents a floating-point number using 32 bits At 620, in the illustrated embodiment, the computing device (e.g., base-2 logarithm circuitry 110) determines coefficients for a polynomial function based on the first input.

In some embodiments, the polynomial function is a third order polynomial. In some embodiments, to determine the coefficients for the polynomial function includes to access a polynomial coefficient table based on the first input.

In some embodiments, a given entry of the polynomial coefficient table includes multiple coefficients for the third order polynomial corresponding to a range of input values.

In some embodiments, the polynomial coefficient table is generated using overlapping intervals such that coefficients for a given entry in the polynomial coefficient table correspond to curve fitting over a greater range of input values than a range of input values corresponding to the entry.

At 630, in the illustrated embodiment, the computing device (e.g., base-2 logarithm circuitry 110) evaluates the polynomial function to determine a first result in a second floating-point format, based on the determined coefficients and the first input.

In some embodiments, the second floating-point format includes a head component and a tail component (e.g., head-tail format). In some embodiments, this includes an N-bit or less head component and N-bit or less tail component. In some embodiments, the head-tail format is used to generate a greater precision result such that rounding error does not become unacceptable in a later stage (e.g., in the multiplication operation at 640). A head-tail format represents a higher precision number using two components of lower precision and operates on the two components individually.

In some embodiments, one or more of the determined coefficients include head and tail components and one or more of the determined coefficients use a non-head-tail representation.

In some embodiments, the first result includes a first head result and a first tail result.

At 640, in the illustrated embodiment, the computing device (e.g., multiplication circuitry 120) multiplies the first result by the second floating-point input to generate a multiplication result.

In some embodiments, the multiplication is a head-tail operation and the multiplication result includes a second head result (e.g., multiplication head result) and a second tail result (e.g., multiplication tail result).

At 650, in the illustrated embodiment, the computing device (e.g., base-2 power function circuitry 130) evaluates two the power of a representation of the multiplication result to generate a result of the single floating-point power function in the first floating-point format.

In some embodiments, to evaluate two to the power of a representation of the multiplication result, the computing device (e.g., base-2 power function circuitry 130) determines coefficients for a third order polynomial function based on the multiplication result and evaluates the third order polynomial function to determine two to the power of a representation of the multiplication result in the first floating-point format.

In some embodiments, the computing device converts the second head result and the second tail result to the first floating-point format to generate converted multiplication result. In some embodiments, the computing device (e.g., base-2 power function circuitry 130) evaluates two the power of the converted multiplication result.

In some embodiments, the first head result, first tail result, second head result, and second tail result are each represented using N bits or less. In some embodiments, the computing device (e.g., execution circuitry 100) further executes a base-2 logarithm instruction and evaluates the base-2 logarithm of an input to generate a result of the base-2 logarithm instruction. In some embodiments, the computing device includes multiplexor circuitry that selects the result of the base-2 logarithm instruction.

In some embodiments, the computing device (e.g., execution circuitry 100) further executes a base-2 power function instruction and evaluates the base-2 power function of an input to generate a result of the base-2 power function instruction. In some embodiments, the computing device (e.g., execution circuitry 100) includes multiplexor circuitry that selects the result of the base-2 power function instruction.

Example Device

Figure 7:
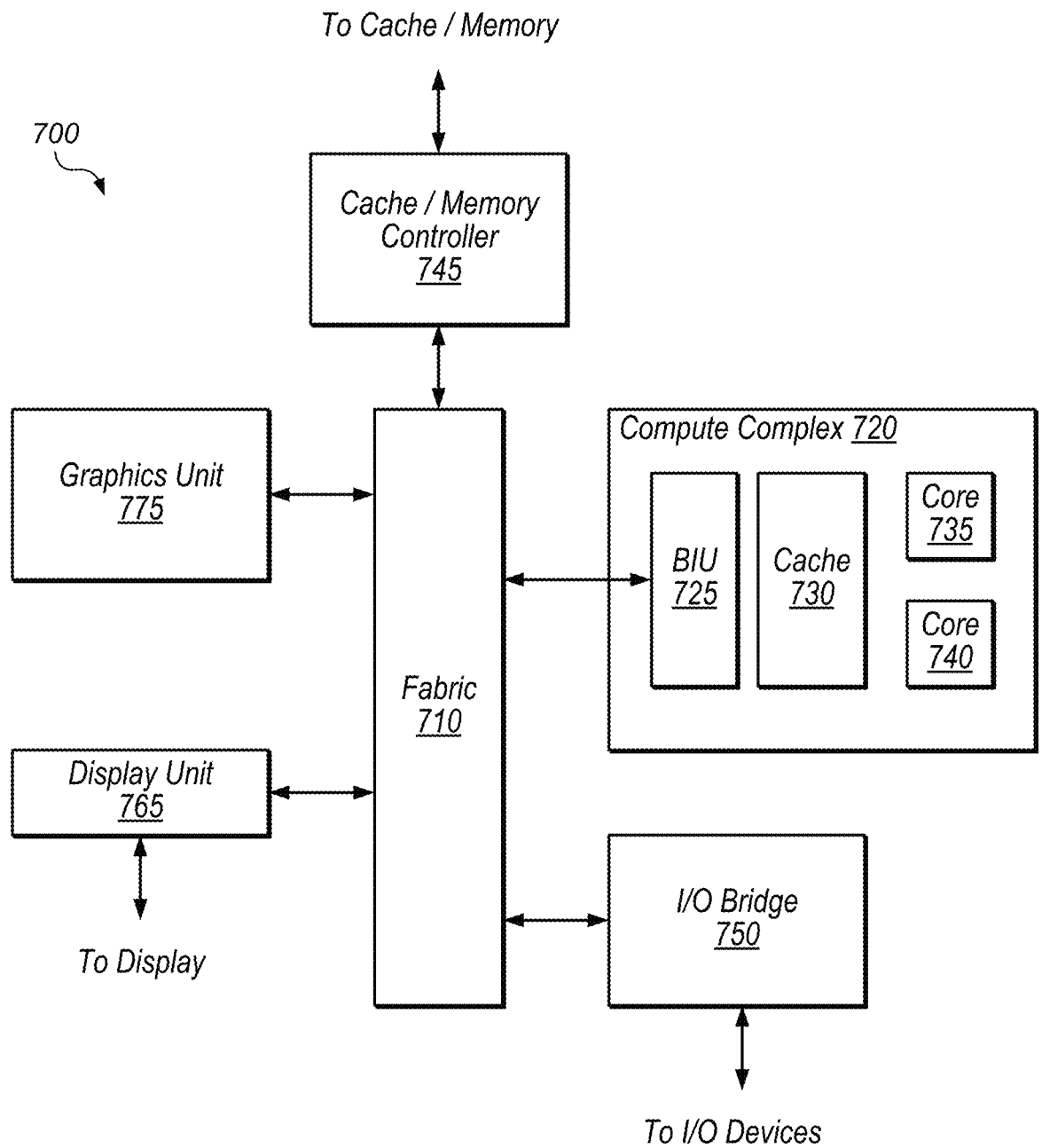
FIG. 7 is a block diagram illustrating an example computing device, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Graphics unit 775 may include one or more processors, e.g., one or more graphics processing units (GPU's). Graphics unit 775 may receive graphics-oriented instructions, such as OPENGL®, Metal, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via WiFi), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth or WiFi Direct), etc. In various embodiments, the network interface circuitry may provide device 700 with connectivity to various types of other devices and networks.

Various elements of FIG. 7 may utilize disclosed techniques. For example, execution circuitry 100 may be included in compute complex 720 or graphics unit 775. Disclosed techniques may advantageously increase performance and reduce power consumption of floating-point power function operations with reasonable area and accuracy, in various embodiments.

Example Applications

Figure 8:
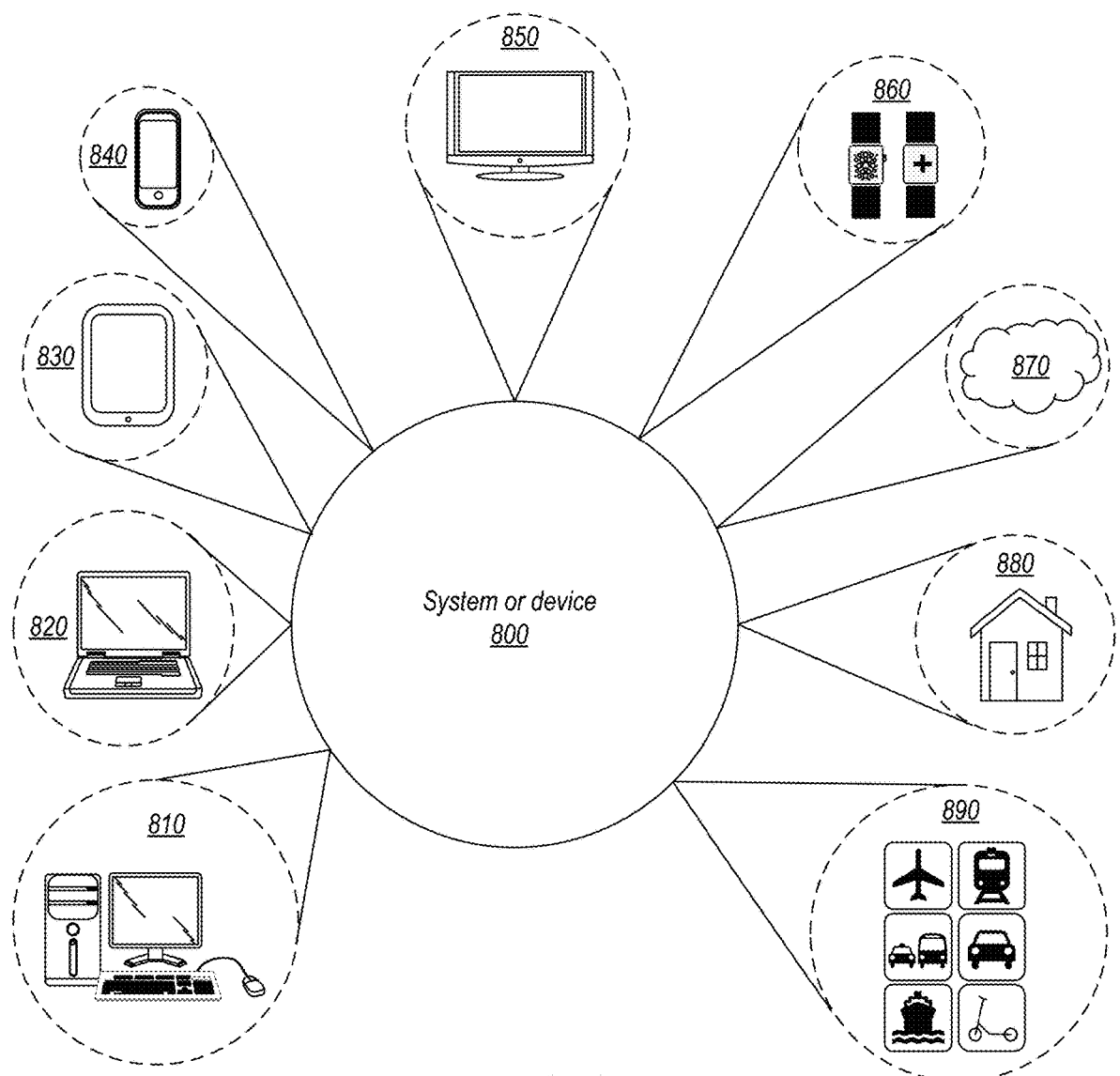
FIG. 8 is a diagram illustrating example applications of disclosed systems and devices, according to some embodiments.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized everyday devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 9:
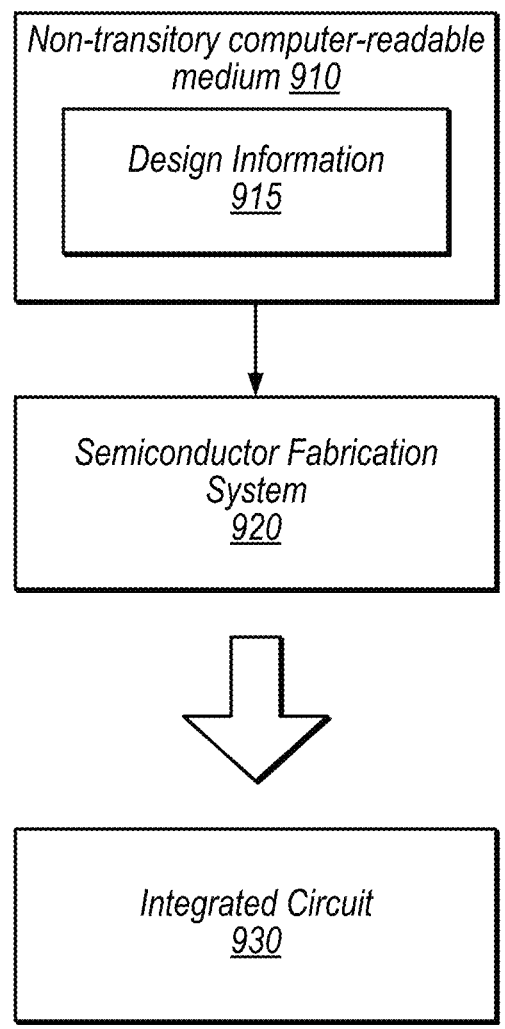
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment semiconductor fabrication system 920 is configured to process the design information 915 stored on non-transitory computer-readable medium 910 and fabricate integrated circuit 930 based on the design information 915.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof.

Non-transitory computer-readable storage medium 910 may include two or more memory mediums which may reside in different locations, e.g., in different computer systems that are connected over a network.

Design information 915 may be specified using any of various appropriate computer languages, including hardware description languages such as, without limitation: VHDL, Verilog, SystemC, SystemVerilog, RHDL, M, MyHDL, etc. Design information 915 may be usable by semiconductor fabrication system 920 to fabricate at least a portion of integrated circuit 930. The format of design information 915 may be recognized by at least one semiconductor fabrication system 920. In some embodiments, design information 915 may also include one or more cell libraries which specify the synthesis, layout, or both of integrated circuit 930. In some embodiments, the design information is specified in whole or in part in the form of a netlist that specifies cell library elements and their connectivity. Design information 915, taken alone, may or may not include sufficient information for fabrication of a corresponding integrated circuit. For example, design information 915 may specify the circuit elements to be fabricated but not their physical layout. In this case, design information 915 may need to be combined with layout information to actually fabricate the specified circuitry.

Integrated circuit 930 may, in various embodiments, include one or more custom macrocells, such as memories, analog or mixed-signal circuits, and the like. In such cases, design information 915 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 is configured to operate according to a circuit design specified by design information 915, which may include performing any of the functionality described herein. For example, integrated circuit 930 may include any of various elements shown in FIGS. 1-5 and 7. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. An apparatus, comprising:
   execution pipeline circuitry configured to, for execution of a single floating-point power instruction, operate on first and second floating-point inputs in a first floating-point format to generate a result that evaluates $2^{(second\ input*log_2(first\ input))}$, wherein the execution pipeline circuitry includes:
      a first pipeline portion having one or more stages that includes base-2 logarithm circuitry configured to evaluate the base-2 logarithm of the first input, including to:
         determine coefficients for a polynomial function based on the first input; and
         evaluate the polynomial function to determine a first result in a second floating-point format, based on the determined coefficients and the first input;
      a second pipeline portion configured to operate on results from the first pipeline portion, including multiplication circuitry configured to receive the first result from the base-2 logarithm circuitry and configured to:
         multiply the received first result by the second floating-point input to generate a multiplication result;
         wherein the second floating-point format includes a head component and a tail component, the multiplication is a head-tail operation, the multiplication result includes a head result and a tail result; and
         wherein the first floating-point format is an N-bit floating-point format;
      and the head result, and tail result are each represented using N bits or less; and
      a third pipeline portion configured to operate on results from the second pipeline portion, including base-2 power function circuitry configured to receive the multiplication result from the multiplication circuitry and configured to:
         evaluate two to the power of a representation of the multiplication result to generate a result of the single floating-point power instruction in the first floating-point format.

2. The apparatus of claim 1, further comprising:
conversion circuitry configured to convert the head result and the tail result to the first floating-point format to generate a converted multiplication result;
wherein the base-2 power function circuitry is configured to evaluate two to the power of the converted multiplication result.

3. The apparatus of claim 1, wherein the polynomial function is a third order polynomial and wherein, to determine coefficients for the third order polynomial, the base-2 logarithm circuitry is further configured to access a polynomial coefficient table based on the first input.

4. The apparatus of claim 3, wherein one or more of the determined coefficients include head and tail components and one or more of the determined coefficients use a non-head-tail representation.

5. The apparatus of claim 3, wherein a given entry of the polynomial coefficient table includes multiple coefficients for the third order polynomial corresponding to a range of input values.

6. The apparatus of claim 5, wherein the polynomial coefficient table is generated using overlapping intervals such that coefficients for a given entry in the polynomial coefficient table correspond to curve fitting over a greater range of input values than a range of input values corresponding to the entry.

7. The apparatus of claim 1, wherein to evaluate two to the power of a representation of the multiplication result the base-2 power function circuitry is configured to:
determine coefficients for a third order polynomial function based on the multiplication result; and
evaluate the third order polynomial function to determine two to the power of a representation of the multiplication result in the first floating-point format.

8. The apparatus of claim 1, wherein the execution pipeline circuitry is further configured to execute a base-2 logarithm instruction, including to evaluate the base-2 logarithm of an input using the base-2 logarithm circuitry to generate a result of the base-2 logarithm instruction; and
wherein the execution pipeline circuitry includes multiplexor circuitry configured to select the result of the base-2 logarithm instruction from the base-2 logarithm circuitry.

9. The apparatus of claim 1, wherein the execution pipeline circuitry is further configured to execute a base-2 power instruction, including to evaluate the base-2 power function of an input using the base-2 power function circuitry to generate a result of the base-2 power instruction; and
wherein the execution pipeline circuitry includes multiplexor circuitry configured to select the result of the base-2 power instruction from the base-2 power function circuitry.

10. The apparatus of claim 1, wherein the apparatus is a computing device that further includes:
a display;
a central processing unit; and
network interface circuitry.

11. A method, comprising:
executing, by pipeline circuitry of a computing device, a single floating-point power instruction that operates on first and second floating-point inputs in a first floating-point format to generate a result that evaluates $2^{(second\ input * log_2(first\ input))}$, wherein the executing includes:
a first pipeline portion determining coefficients for a polynomial function based on the first input;
the first pipeline portion evaluating the polynomial function to determine a first result in a second floating-point format, based on the determined coefficients and the first input;
a second pipeline portion operating on results from the first pipeline portion, including receiving the first result and multiplying the first result by the second floating-point input to generate a multiplication result, wherein the second floating-point format includes a head component and a tail component, the multiplication is a head-tail operation, the multiplication result includes a head result and a tail result, the first floating-point format is an N-bit floating-point format, and the head result, and tail result are each represented using N bits or less; and
a third pipeline portion operating on results from the second pipeline portion, including receiving the multiplication result and evaluating two to the power of a representation of the multiplication result to generate a result of the single floating-point power function in the first floating-point format.

12. The method of claim 11, wherein the polynomial function is a third order polynomial and wherein, to determine coefficients for the third order polynomial includes accessing a polynomial coefficient table based on the first input.

13. The method of claim 12, wherein one or more of the determined coefficients include head and tail components and one or more of the determined coefficients use a non-head-tail representation.

14. A non-transitory computer-readable medium having instructions stored thereon that are executable by a computing device to perform operations comprising:
executing, by pipeline circuitry of the computing device, a single floating-point power instruction of the instructions to operate on first and second floating-point inputs in a first floating-point format to generate a result that evaluates $2^{(second\ input * log_2(first\ input))}$, wherein the executing includes:
a first pipeline portion evaluating a base-2 logarithm of the first input, including to determine coefficients for a polynomial function based on the first input and evaluate the polynomial function to determine a first result in a second floating-point format, based on the determined coefficients and the first input;
a second pipeline portion operating on results from the first pipeline portion, including receiving the first result and multiplying the first result by the second floating-point input to generate a multiplication result, wherein the second floating-point format includes a head component and a tail component, the multiplication is a head-tail operation, the multiplication result includes a head result and a tail result, the first floating-point format is an N-bit floating-point format, and the head result, and tail result are each represented using N bits or less; and
a third pipeline portion operating on results from the second pipeline portion, including receiving the multiplication result and evaluating two to the power of a representation of the multiplication result to generate a result of the single floating-point power instruction in the first floating-point format.

15. The non-transitory computer-readable medium of claim 14, wherein the executing further includes:
converting the head result and the tail result to the first floating-point format to generate a converted multiplication result.

16. The non-transitory computer-readable medium of claim 14, wherein the executing further includes:
determining coefficients for a third order polynomial function to evaluate the base-2 logarithm of the first input, wherein the determining includes accessing a polynomial coefficient table based on the first input.

* * * * *